United States Patent
Alecu

(10) Patent No.: US 9,200,570 B2
(45) Date of Patent: Dec. 1, 2015

(54) AIR-COOLED OIL COOLER FOR TURBOFAN ENGINE

(75) Inventor: Daniel T. Alecu, Toronto (CA)

(73) Assignee: PRATT & WHITNEY CANADA CORP., Longueuill (CA)

( * ) Notice: Subject to any disclaimer, the term of this patent is extended or adjusted under 35 U.S.C. 154(b) by 923 days.

(21) Appl. No.: 13/404,092

(22) Filed: Feb. 24, 2012

(65) Prior Publication Data

US 2013/0219854 A1    Aug. 29, 2013

(51) Int. Cl.

| F02C 7/14 | (2006.01) |
|---|---|
| F02K 3/115 | (2006.01) |
| F02C 7/18 | (2006.01) |
| F28D 21/00 | (2006.01) |
| F02K 3/02 | (2006.01) |

(52) U.S. Cl.
CPC ... *F02C 7/14* (2013.01); *F02C 7/18* (2013.01); *F02K 3/115* (2013.01); *F02K 3/02* (2013.01); *F05D 2260/213* (2013.01); *F05D 2260/22141* (2013.01); *F28D 2021/0089* (2013.01)

(58) Field of Classification Search
CPC ............. F02K 3/02; F02K 3/115; F02C 7/06; F02C 7/12; F28D 2021/0021; F28D 2021/0089; F28D 7/00; F28D 7/16; F01D 25/12; F05D 2260/20; F05D 2260/213; F05D 2260/2214; F05D 2260/22141
USPC ............. 60/267, 785, 39.08, 39.83, 730, 782, 60/226.3, 266, 204, 226.1
See application file for complete search history.

(56) References Cited

U.S. PATENT DOCUMENTS

| 2,625,009 | A | | 1/1953 | Legett |
|---|---|---|---|---|
| 4,546,605 | A | | 10/1985 | Mortimer |
| 4,567,076 | A | * | 1/1986 | Therrien .................. 428/102 |
| 4,601,202 | A | * | 7/1986 | Colman et al. .................. 73/431 |
| 4,608,819 | A | * | 9/1986 | Colman et al. ............... 60/39.83 |
| 4,914,904 | A | | 4/1990 | Parnes |
| 4,999,994 | A | | 3/1991 | Rud |
| 5,203,163 | A | | 4/1993 | Parsons |
| 5,269,135 | A | | 12/1993 | Vermejan |
| 5,351,473 | A | | 10/1994 | Shuba |
| 5,438,823 | A | | 8/1995 | Loxley |
| 5,987,877 | A | | 11/1999 | Steiner |
| 6,000,210 | A | | 12/1999 | Negulescu |
| 6,931,834 | B2 | | 8/2005 | Jones |
| 7,377,100 | B2 | | 5/2008 | Bruno |
| 7,454,894 | B2 | | 11/2008 | Larkin |
| 7,685,804 | B2 | | 3/2010 | Evulet |
| 7,685,805 | B2 | * | 3/2010 | Alecu .......................... 60/226.1 |
| 7,698,894 | B2 | | 4/2010 | Wood |
| 7,861,512 | B2 | * | 1/2011 | Olver et al. .................. 60/226.1 |
| 7,946,806 | B2 | * | 5/2011 | Murphy ....................... 415/145 |

(Continued)

*Primary Examiner* — Phutthiwat Wongwian
*Assistant Examiner* — Alain Chau
(74) *Attorney, Agent, or Firm* — Norton Rose Fulbright Canada LLP

(57) ABSTRACT

A turbofan gas turbine engine comprises a nacelle cowl and a core engine. A bypass duct is between an outer surface of a casing of the core engine, and an inner surface of the nacelle cowl. An air channel is in the nacelle cowl, an inlet and an outlet of the air channel being in an outer surface of the nacelle cowl. An oil cooler has at least one oil passage for oil circulation, the air cooler having a first heat exchange surface in the air channel exposed to air circulating in the air channel, the air channel having a second heat exchange surface in the bypass duct exposed to air circulating in the bypass duct. A method for cooling oil in a turbofan gas turbine engine is also provided.

17 Claims, 3 Drawing Sheets

(56) References Cited

U.S. PATENT DOCUMENTS

| | | |
|---|---|---|
| 7,966,831 B2 | 6/2011 | Kraft |
| 2006/0042225 A1 | 3/2006 | Bruno |
| 2008/0095611 A1* | 4/2008 | Storage et al. ............... 415/116 |
| 2011/0135455 A1* | 6/2011 | Wang et al. .................. 415/178 |
| 2011/0179767 A1* | 7/2011 | Rinjonneau et al. ........... 60/224 |

* cited by examiner

AIR-COOLED OIL COOLER FOR TURBOFAN ENGINE

TECHNICAL FIELD

The application relates generally to turbofan engines and, more particularly, to an air-cooled oil cooler of a turbofan engine.

BACKGROUND OF THE ART

Typical engine air cooled oil coolers of turbofan gas turbine engines, known as surface coolers, are provided with fins on the side facing the engine bypass airflow. The heat transfer density per cooler unit area is limited by the maximum fin height to reduce perturbations in the bypass duct, and by the air temperature in the bypass duct.

Accordingly, there is a need to provide an improved air-cooled oil cooler in gas turbine engines.

SUMMARY

In one aspect, there is provided a turbofan gas turbine engine comprising: a nacelle cowl; a core engine; a bypass duct between an outer surface of a casing of the core engine, and an inner surface of the nacelle cowl; an air channel in the nacelle cowl, an inlet and an outlet of the air channel being in an outer surface of the nacelle cowl; and an oil cooler having at least one oil passage for oil circulation, the air cooler having a first heat exchange surface in the air channel exposed to air circulating in the air channel, the air channel having a second heat exchange surface in the bypass duct exposed to air circulating in the bypass duct.

In a second aspect, there is provided a method for cooling oil in a turbofan gas turbine engine, comprising: circulating oil in an oil cooler in a nacelle cowl; directing air from an inlet in an outer surface of the nacelle cowl into an air channel and on a first heat exchange surface of the oil cooler; and directing air of a bypass duct on a second heat exchange surface of the oil cooler.

Further details of these and other aspects of the present invention will be apparent from the detailed description and figures included below.

DESCRIPTION OF THE DRAWINGS

Reference is now made to the accompanying figures, in which.

DETAILED DESCRIPTION OF THE EMBODIMENTS

Figure 1:
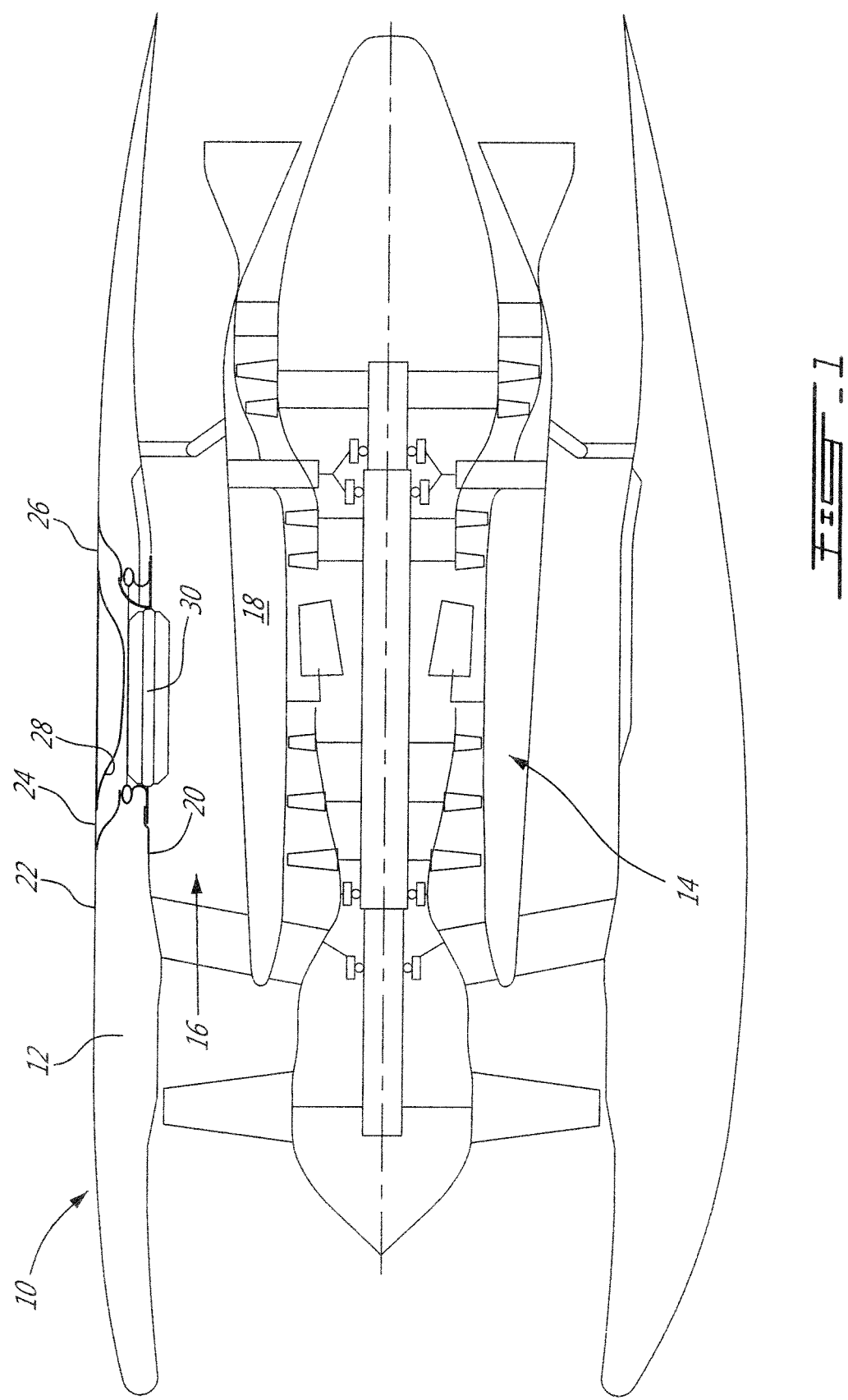
FIG. 1 is a schematic cross-sectional view of a turbofan gas turbine engine with an air-cooled oil cooler in accordance with the present disclosure.

FIG. 1 illustrates a turbofan gas turbine engine 10 of a type preferably provided for use in subsonic flight, generally comprising a nacelle cowl 12. A core engine 14 is axially positioned within the nacelle cowl 12. A bypass duct 16 is defined between an outer surface of a core casing 18 of the core engine 14 and an inner surface 20 of the nacelle cowl 12. The nacelle cowl 12 has the inner surface 20 and an outer surface 22.

An ambient air scoop 24 (i.e., air inlet) is defined in the nacelle cowl 12, and is in the outer surface 22. The ambient air scoop 24 is in fluid communication with an air outlet 26, by way of an air channel 28. Accordingly, ambient air enters via the air scoop 24, travels through the air channel 28 to then exits via the air outlet 26. The air outlet 26 may be located as in FIG. 1 at a low pressure location along the nacelle cowl 12. The air channel 28 is oriented inward of the outer surface of the nacelle cowl 12 at the air scoop 24. According to an embodiment, the parts of the nacelle cowl 12 surrounding the air channel 28 may include an ablative foam (e.g., injection molded) surrounded by low-pressure soft seals.

Figure 2:
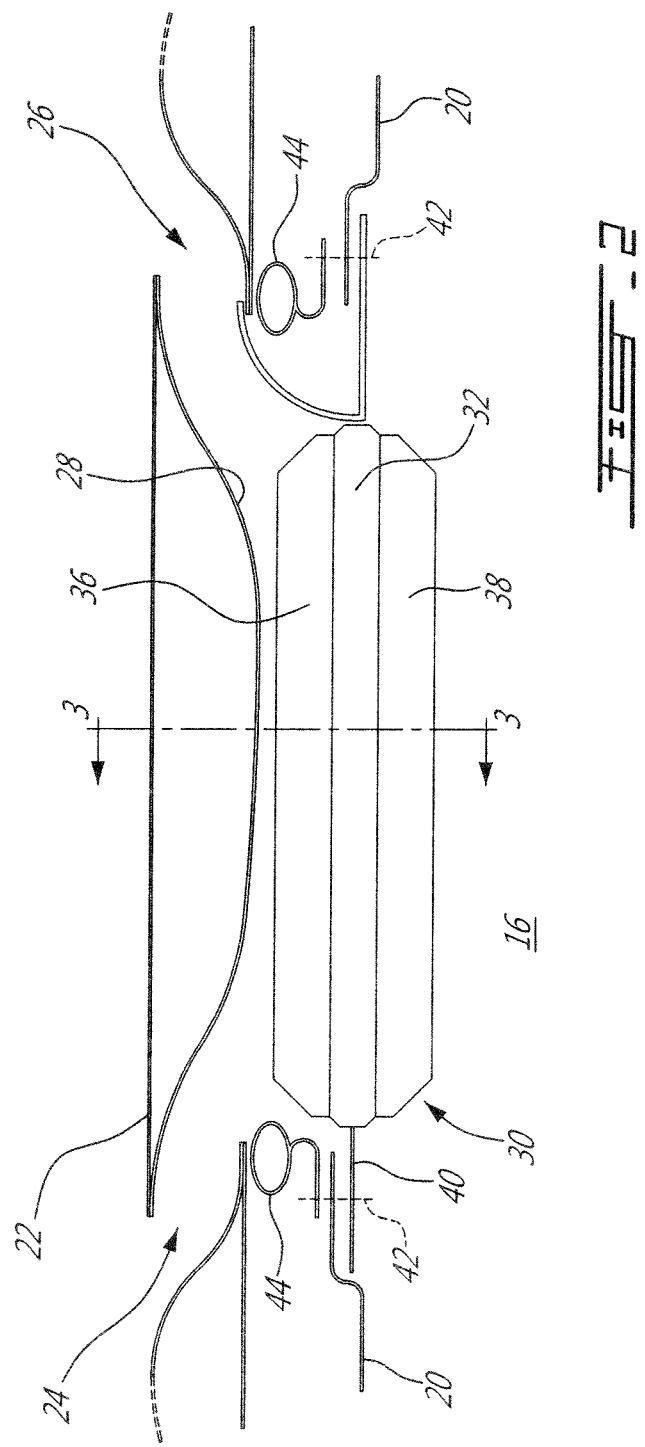
FIG. 2 is an enlarged sectional view of the turbofan gas turbine engine showing the air-cooled oil cooler.
Figure 3:
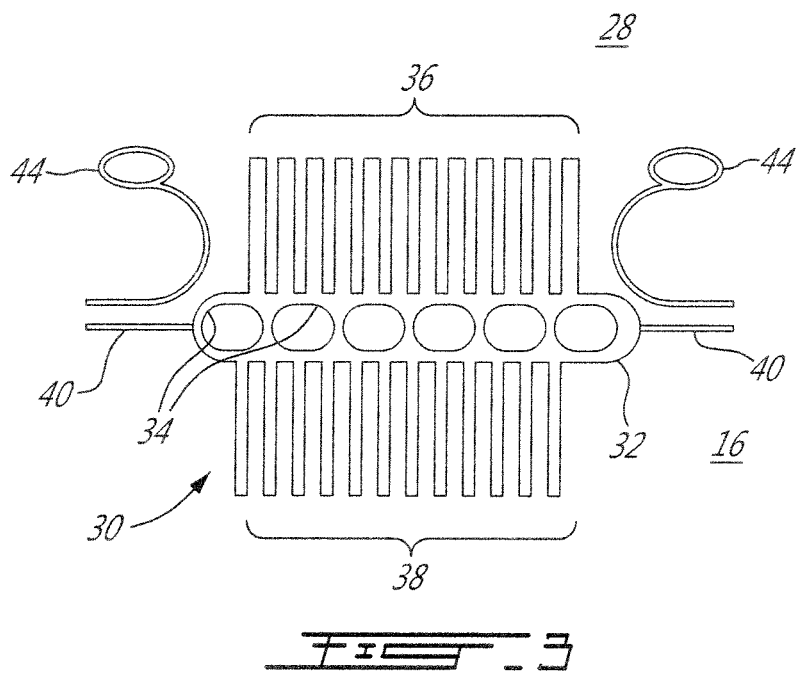
FIG. 3 is a sectional view of the air-cooled oil cooler of FIG. 2, taken along sectional line 3-3 of FIG. 2.
Figure 4:
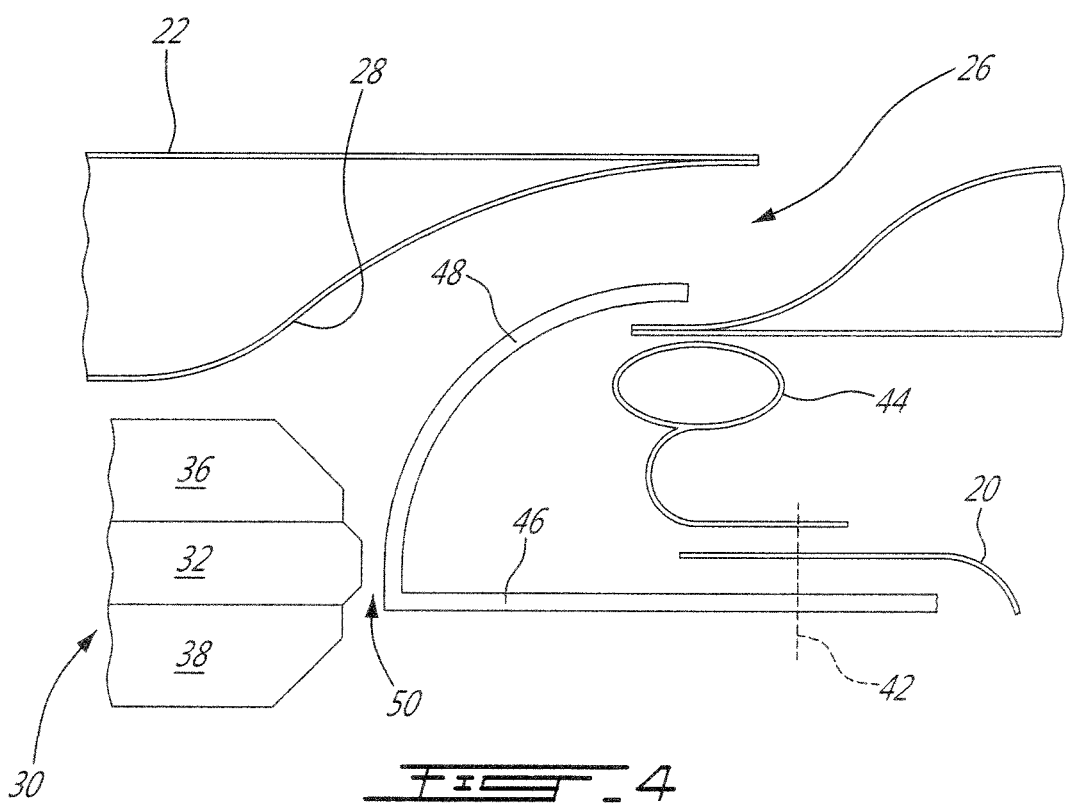
FIG. 4 is an enlarged view of a downstream rear end of the air-cooled oil cooler.

Referring to FIG. 2, an air-cooled oil cooler 30 (hereinafter ACOC) has a side thereof partly in the air channel 28 to be exposed to the scooped ambient air. As shown in FIG. 3, the ACOC 30 has a body 32 in which oil passages 34 (FIG. 3) are defined. The body 32 may be a double wall plate. The body 32 may be generally coplanar with an inner surface of the nacelle cowl 12, in the bypass duct 16. The ACOC 30 may be in a coil configuration with one inlet port and one outlet port (not shown) that are part of an oil circuit of the turbofan engine. Other configurations are considered as well. For instance, the ACOC 30 may have multiple ports.

The ACOC 30 has a pair of heat exchange surfaces—it is two-sided. One of the heat exchange surfaces is in the channel 28 and therefore exposed to air circulating therein, while another of the heat exchange surfaces is in the bypass duct 16 and therefore exposed to bypass air. Sets of fins 36 and 38 project from both sides of the body 32. The fins project either outwardly or inwardly, and may be radially or quasi-radially oriented, and therefore extend lengthwise in the direction of airflow to be streamlined. Cowl-side fins 36 are located in the air channel 28, whereas bypass-side fins 38 project into the bypass duct 16. It is observed that the fins 36 and 38 generally extend in an axial direction with channels defined therebetween. Accordingly, the air circulating in either one of the air channel 28 and bypass duct 16 may circulate through the channels between the fins 36 or 38.

Referring to FIG. 2, an assembly of the ACOC 30 in the turbofan engine 12 is shown in greater detail. According to the illustrated embodiment, the ACOC 30 may have a flange 40 by which it is connected by way of fasteners 42 to the nacelle cowl 12. In an embodiment, the flange 40 extends upstream and laterally from the body 32, but not downstream. Seals 44 may be provided where appropriate to prevent air leakage between the ACOC 30 and the nacelle cowl 12.

A wall 46 is located downstream of the ACOC 30. The wall 46 is shown as having a generally flat wall portion in the bypass duct 16, and an arcuate wall portion in the air channel 28. The arcuate surface may be a Coanda convex surface 48. The wall 46 is separated from the rear end of the ACOC 30, thereby defining a nozzle 50. Alternatively, a rear end of the ACOC 30 may be connected to the wall 46 with a plurality of calibration holes in a flange of the ACOC 30, to allow bleed air to circulate from the bypass duct 16 to the channel 28. The nozzle 50, calibration holes, etc define an ejector that allows air to bleed from the bypass duct 16 to the air channel 28. The air bleed from the engine bypass 16 enhances the airflow on both sides of the cooler 30, by forced entrainment. Moreover, the Coanda convex surface 48 may enhance the operation of the ejector. The bleed air may be preheated as it is bled downstream of the ACOC 30 in the bypass duct 16 (and may therefore have gone through the fins 38, thereby increasing the efficiency of the motive flow by increased energy content. The bleeding may reduce the blockage effect of the fins 36 thereby improving the air mass flow therethrough. Any appropriate bleed ports may be used at the rear end of the ACOC 30.

During operation, oil is circulated in the ACOC 30. By having the ACOC 30 exposed to both the bypass air and the ambient air in the air channel 28, the oil circulating in the ACOC 30 benefits from both air sources to be cooled. By having fins on both sides of the ACOC 30 as opposed to a single side as in the prior art, the width or length of the ACOC 30 may be reduced in the bypass duct 16 for a same heat transfer.

The ACOC 30 increases the heat transfer density by providing heat exchange surfaces (e.g., fins) on both sides of the cooler 30. The ACOC 30 uses cooler ambient air to cool one side of the cooler 30. This approach reduces the unit weight, as most of the weight is concentrated in the body 32. Moreover, this approach reduces the perturbation of the engine air bypass flow due to the reduced since surface area in the bypass duct 16.

The above description is meant to be exemplary only, and one skilled in the art will recognize that changes may be made to the embodiments described without departing from the scope of the invention disclosed. For example, any arrangement of seal and fasteners may be used to connect the ACOC 32 to the nacelle cowl 12. Alternatively, the ACOC 32 may be integrated in the engine bypass duct and the nacelle cowl structure as opposed to being releasably fastened thereto. The oil flow can be arranged to first wet the heat exchange surface exposed to the engine bypass duct 16 and then the heat exchange surface in the channel 28. For instance, there may be two layers of oil passages, with one on the bypass duct side, and the other on the side of channel 28. The bypass duct layer of oil passages may receive the inlet feed of oil, while the air channel layer of oil passages may be outlet the oil. It is considered to connect a rear end of the ACOC 32 to the nacelle cowl 12 as well. The ACOC 32 is shown with fins 36 and 38. However, any appropriate key exchange surface may be used as well in the ACOC 32. Still other modifications which fall within the scope of the present invention will be apparent to those skilled in the art, in light of a review of this disclosure, and such modifications are intended to fall within the appended claims.

What is claimed is:

1. A turbofan gas turbine engine comprising:
   a nacelle cowl;
   a core engine;
   a bypass duct between an outer surface of a casing of the core engine, and an inner surface of the nacelle cowl;
   an air channel in the nacelle cowl, an inlet and an outlet of the air channel being in an outer surface of the nacelle cowl; and
   an oil cooler having at least one oil passage for oil circulation, the oil cooler having a first heat exchange surface solely in the air channel exposed to air circulating in the air channel, the oil cooler having a second heat exchange surface solely in the bypass duct exposed to air circulating in the bypass duct.

2. The turbofan gas turbine engine according to claim 1, wherein the first heat exchange surface and the second heat exchange surface comprise fins.

3. The turbofan gas turbine engine according to claim 2, wherein the fins extend lengthwise in a direction of airflow.

4. The turbofan gas turbine engine according to claim 1, further comprising bleed holes at a rear end of the oil cooler for bleeding air from the bypass duct to the air channel to entrain air circulation in the air channel.

5. The turbofan gas turbine engine according to claim 4, further comprising a Coanda surface in the air channel adjacent to the bleed holes.

6. The turbofan gas turbine engine according to claim 1, wherein the outlet of the air channel is located at a low pressure location on an outer surface of the nacelle cowl.

7. The turbofan gas turbine engine according to claim 1, wherein a portion of the nacelle cowl in the environment of the air channel comprises an ablative foam.

8. The turbofan gas turbine engine according to claim 1, wherein a portion of the air cooler comprising the at least one oil passage is generally coplanar with an outer surface of the bypass duct.

9. The turbofan gas turbine engine according to claim 1, wherein at least one oil passage has an elongated passage portion that is generally axially oriented in the turbofan gas turbine engine.

10. A method for cooling oil in a turbofan gas turbine engine, comprising:
    circulating oil in an oil cooler in a nacelle cowl;
    directing air from an inlet in an outer surface of the nacelle cowl into an air channel passing through the nacelle cowl and on a first heat exchange surface of the oil cooler, said first heat exchange surface being solely in the air channel; and
    directing air of a bypass duct on a second heat exchange surface of the oil cooler, said second heat exchange surface being solely in the bypass duct.

11. The method according to claim 10, further comprising entraining air circulation in the air channel by bleeding air from the bypass duct into the air channel.

12. The method according to claim 11, wherein bleeding air from the bypass duct comprises bleeding air heated by the second heat exchange surface.

13. The method according to claim 10, further comprising outletting air from the air channel at a low pressure location on an outer surface of the nacelle cowl.

14. The method according to claim 10, wherein directing air on the first heat exchange surface comprises directing air through fins of the oil cooler.

15. The method according to claim 10, wherein directing air on the second heat exchange surface comprises directing air through fins of the oil cooler.

16. The method according to claim 10, wherein circulating the oil in the oil cooler comprises firstly circulating the oil in passages adjacent to the second heat exchange surface, and subsequently circulating the oil in passages adjacent to the first heat exchange surface.

17. The method according to claim 10, wherein circulating the oil in the oil cooler comprises circulating the oil in at least one elongated passage portion that is generally axially oriented in the turbofan gas turbine engine.

* * * * *